US011924952B2

(12) United States Patent
Kowalski

(10) Patent No.: US 11,924,952 B2
(45) Date of Patent: *Mar. 5, 2024

(54) MICROWAVE ASSISTED PARALLEL PLATE E-FIELD APPLICATOR

(71) Applicant: DSGI TECHNOLOGIES, INC., San Jose, CA (US)

(72) Inventor: Jeffrey Edward Kowalski, San Jose, CA (US)

(73) Assignee: DSGI Technologies, Inc., San Jose, CA (US)

( * ) Notice: Subject to any disclaimer, the term of this patent is extended or adjusted under 35 U.S.C. 154(b) by 626 days.

This patent is subject to a terminal disclaimer.

(21) Appl. No.: 16/851,281

(22) Filed: Apr. 17, 2020

(65) Prior Publication Data

US 2020/0245418 A1 Jul. 30, 2020

Related U.S. Application Data

(62) Division of application No. 15/009,070, filed on Jan. 28, 2016, now Pat. No. 10,667,340.

(60) Provisional application No. 62/109,355, filed on Jan. 29, 2015.

(51) Int. Cl.
*H05B 6/80* (2006.01)
*H05B 6/64* (2006.01)

(52) U.S. Cl.
CPC ............. *H05B 6/80* (2013.01); *H05B 6/6411* (2013.01); *H05B 6/6447* (2013.01); *H05B 6/806* (2013.01)

(58) Field of Classification Search
CPC ........... H05B 6/707; H05B 6/72; H05B 6/725
USPC .............................. 219/690, 691, 697; 451/7
See application file for complete search history.

(56) References Cited

U.S. PATENT DOCUMENTS

| | | | | |
|---|---|---|---|---|
| 5,451,751 | A * | 9/1995 | Takimoto | H05B 6/76 219/754 |
| 7,928,021 | B2 * | 4/2011 | Kowalski | H01L 21/67115 257/E21.328 |
| 2014/0073065 | A1 * | 3/2014 | Ohno | H05B 6/6455 219/710 |

* cited by examiner

*Primary Examiner* — Tu B Hoang
*Assistant Examiner* — Thomas J Ward
(74) *Attorney, Agent, or Firm* — Hovey Williams LLP

(57) ABSTRACT

A system and method for annealing a target substrate such as a semiconductor using industrial microwave heating and parallel plate reaction. Using a uniform microwave field, with the target substrate located between parallel plates controls application of eddy currents to the target substrate. The system may include a uniform microwave field generator, support elements, two plates held in parallel to each other, and a turntable device configured to rotate the two plates and the target substrate within the uniform microwave field. The rotating of the plates and target substrate in the uniform microwave field creates a periodic change in polarity of the microwaves applied to the target substrate. The eddy currents in the uniform microwave field react by flowing perpendicular to the plates, and not parallel to the surface as in traditional microwave reactions of metals. This redirection of the eddy currents provides even heating of the target substrate.

6 Claims, 8 Drawing Sheets

MICROWAVE ASSISTED PARALLEL PLATE E-FIELD APPLICATOR

RELATED APPLICATIONS

The current patent application is a divisional patent application which claims priority benefit, with regard to all common subject matter, of U.S. patent application Ser. No. 15/009,070, entitled "MICROWAVE ASSISTED PARALLEL PLATE E-FIELD APPLICATOR", filed Jan. 28, 2016, which itself claims priority benefit, with regard to all common subject matter, of earlier-filed U.S. provisional patent application titled "MICROWAVE ASSISTED PARALLEL PLATE E-FIELD APPLICATOR", Ser. No. 62/109,355, filed Jan. 29, 2015. The listed applications are hereby incorporated by reference, in their entireties, into the current patent application.

BACKGROUND

Advances in miniaturization of semiconductor devices have led to better performance and increased storage capacity for many electronic devices. Many process steps are involved in the manufacturing of semiconductor devices. One step is the doping of semiconductor substrate to form source/drain junctions. Ion-implantation is used to modify the electrical characteristics of the semiconductor substrate by the implantation of specific dopant impurities into the semiconductor wafer surface. The dopants that are commonly used are Boron, Arsenic, and Phosphorus. With the use of ion-implantation, a post annealing treatment is desired to complete the activation process and repair any associated damage to the implanted region. Various annealing techniques may be used, depending on the implant dosage (amount of atoms implanted in the surface) and the implant energy (depth of atoms into the surface). For example, annealing techniques may include furnace processing, Rapid Thermal Processing (RTP), Millisecond Anneal (MSA) and various other versions including laser annealing. However, there are disadvantages associated with each of these techniques, as described in U.S. Pat. No. 7,928,021, incorporated by referenced herein in its entirety.

Experiments using microwave heating for this annealing process have been performed within the solid state device industry, but use of microwave heating suffers from a number of disadvantages. For microwave heating, a multi-mode reaction chamber is used to heat/process a target substrate relatively larger than the wavelength of the microwave used. Within a multi-mode chamber, the microwave energy couples through mode excitation to govern the local microwave field, also referred to as an E-field. The E-field can also be influenced by the dielectric properties of the target substrate being heated inside the multi-mode chamber. Microwaves will flow in higher concentrations to the target substrate if it is made of a material with proper dielectrics. Based on the electromagnetic property of the microwaves and the skin effect of the target substrate within the multi-mode chamber, the target substrate may form a flow of current therethrough or on its surface based on its conductivity.

Unfortunately, E-field concentration can be difficult to monitor and control. For example, if the concentration of the E-field is strong enough, it can cause undesired thermal runaway and arcing independent of the microwave dielectric reaction, which can cause non-uniform heating and potential damage to the target substrate within the multi-mode reaction chamber. Stirrers and rotation plates have been used to attempt to make the E-field more uniform and metal foil layers have also been used to change the field energy locally to the target substrate being heated. However, each of these methods faces a challenge of trying to manage, minimize, or eliminate the formation of eddy currents to avoid uneven heating traditionally caused thereby.

Another method to heat the target substrate is a parallel plate reactor, most commonly used with radio frequencies (RF), mainly due to technical limitations at higher frequencies. Thus, the independent parallel plate reactor is generally limited to frequencies in the RF band and creates a limited reaction in the target substrate due to the wavelength used. RF heating in the prior art has only been introduced to the solid state market as a bulk heater, with no real difference in heating as compared to other traditional heating methods such as infrared and the like.

SUMMARY OF THE INVENTION

Embodiments of the present invention solve the above-mentioned problems and provide a distinct advance in the art of annealing semiconductor materials. Specifically, embodiments of the present invention may provide an annealing system and method for annealing a target substrate such as a semiconductor using industrial microwave heating and parallel plate reaction.

In some embodiments of the invention, the annealing system may include a uniform microwave field generator, two plates held proximate and/or in parallel to each other, and a turntable device coupled to the two plates and the target substrate within the uniform microwave field. The uniform microwave field generator may generate a uniform microwave field, and the two plates may be held a distance apart from each other within the uniform microwave field generator. Specifically, the plates may be spaced sufficiently close together to form a capacitance effect therebetween within the uniform microwave field. The turntable may rotate the plates and the target substrate within the uniform microwave field, creating a periodic change in polarity of microwaves applied to the target substrate from the uniform microwave field, thereby causing eddy currents to flow perpendicular to the plates and the target substrate.

Another embodiment of the invention includes a method for annealing semiconductor material, including placing a target substrate made of the semiconductor material between two plates within a uniform microwave field, and creating a periodic change in polarity of microwaves applied to the target substrate from the uniform microwave field. The periodic change provides perpendicular flow of eddy currents relative to the target substrate and the plates.

In yet another embodiment of the invention, a method for annealing semiconductor material includes the steps of doping parallel plates and then placing a target substrate made of the semiconductor material between the parallel plates within a uniform microwave field. The doping may be sufficient to cause the parallel plates to react to the uniform microwave field, and the parallel plates may be spaced sufficiently close together to form a capacitance effect therebetween within the uniform microwave field. The target substrate may include the semiconductor material doped with impurities. The uniform microwave field may include frequencies in a range of 900 MHz to 26 GHz. Next, the method may include a step of rotating the parallel plates and target substrate within the uniform microwave field, thereby creating a periodic change in polarity of microwaves applied to the target substrate from the uniform microwave field. The periodic change may provide perpendicular flow of eddy currents relative to the target substrate and the parallel plates, thus providing even heating of the target substrate and selectively heating defects in the target substrate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

Figure 4:
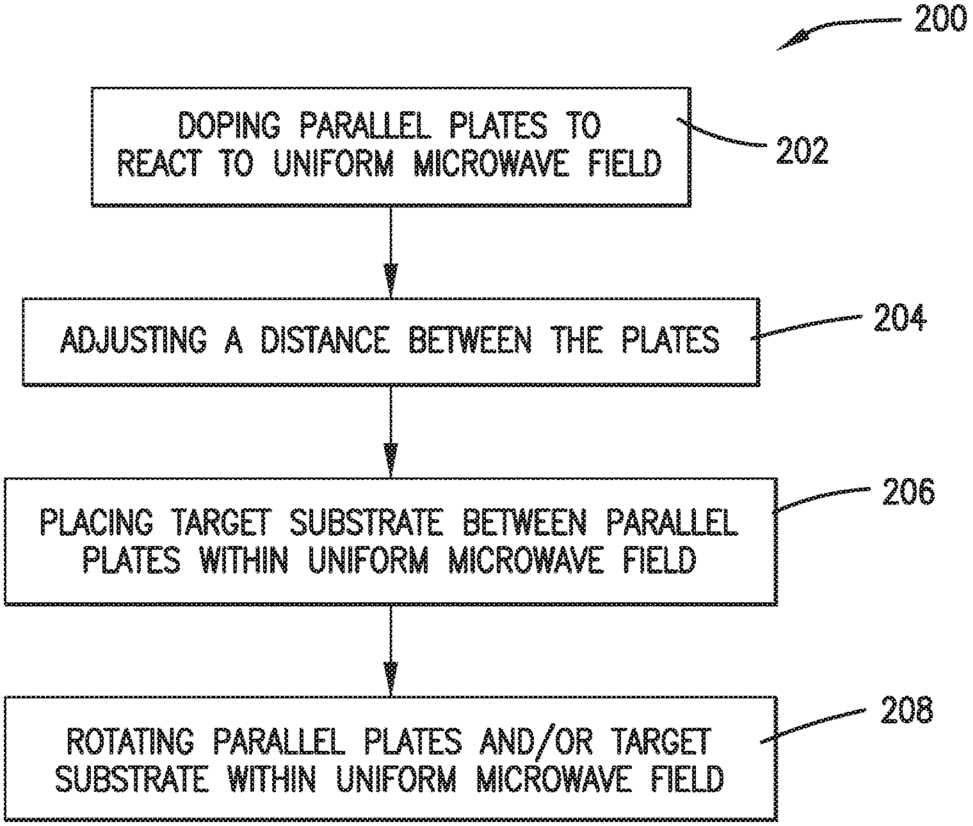
FIG. 4 is a flow chart of an annealing method in accordance with various embodiments of the invention.
Figure 8:
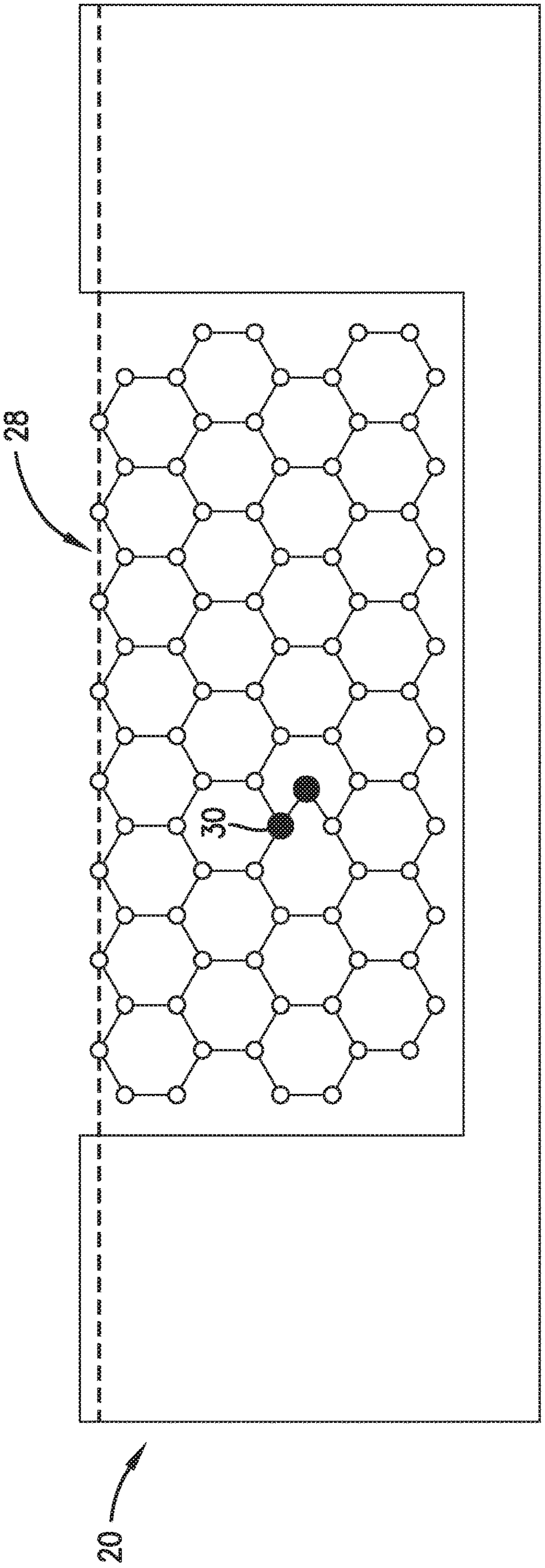
FIG. 8 is a schematic view of a target substrate having a silicon crystal lattice with a defect therein.
Figure 9:
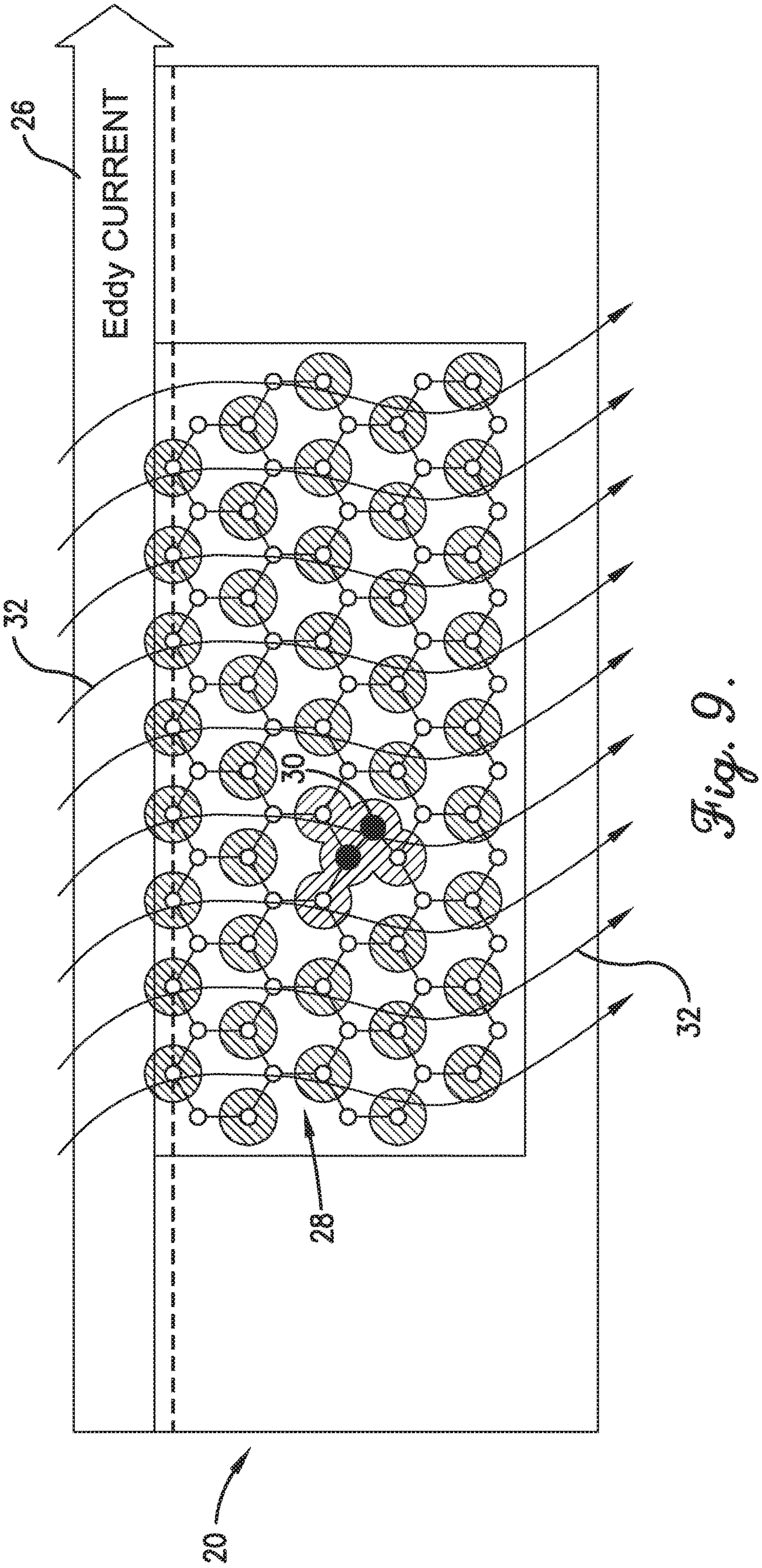
Fig. 9. PRIOR ART
Figure 10:
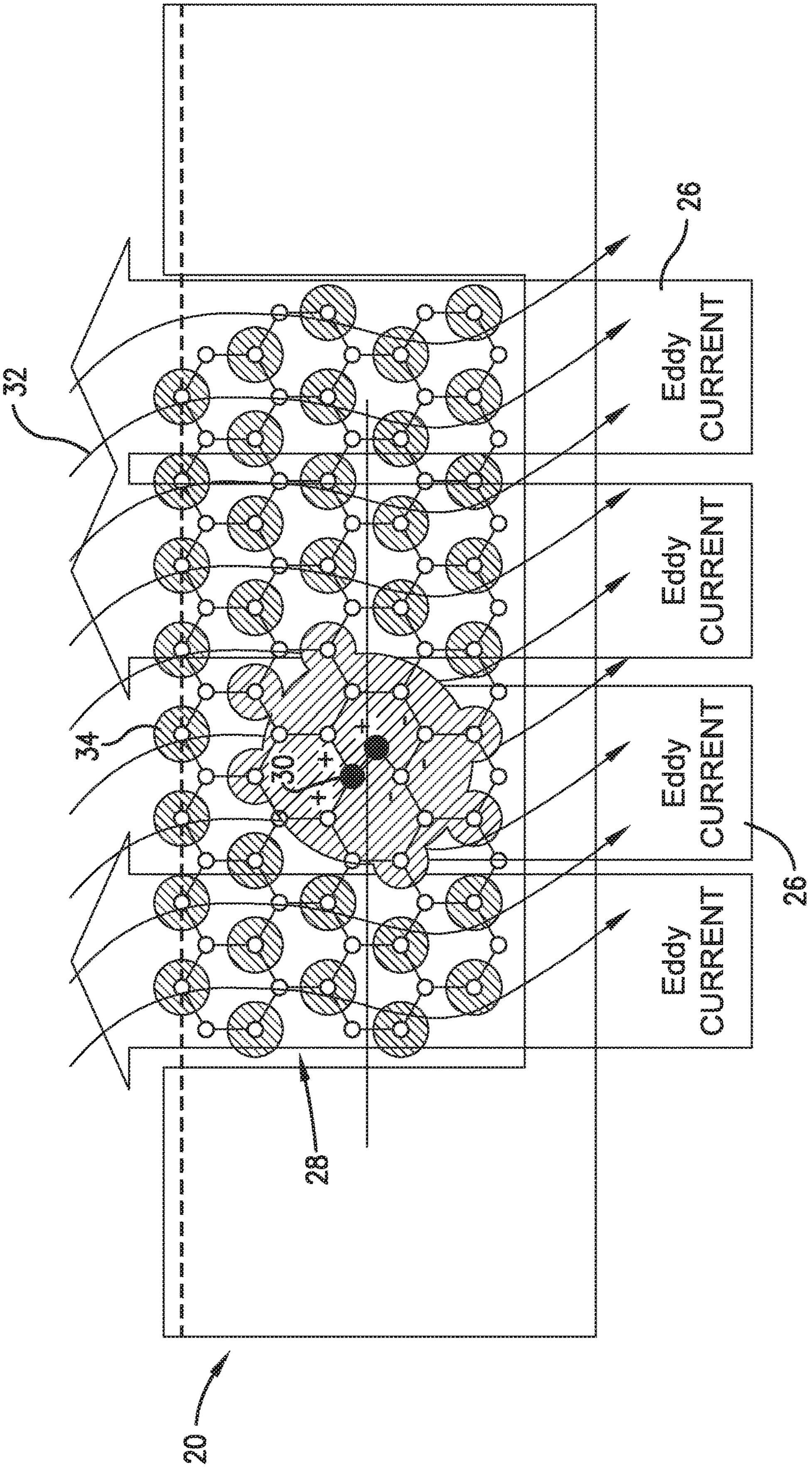

FIG. 9 is a schematic view of the target substrate of FIG. 8 undergoing prior art traditional microwave heating, with eddy current flowing at the surface of the target substrate and parallel thereto; and FIG. 10 is a schematic view of the target substrate of FIG. 8 undergoing mobility annealing using the method of FIG. 4, with eddy current flowing into the target substrate and perpendicular thereto.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Embodiments of the present invention relate to annealing systems. Specific embodiments of the invention relate to industrial microwave heating using a uniform microwave field and parallel plates to control application of eddy currents to a target substrate 20.

Figure 1:
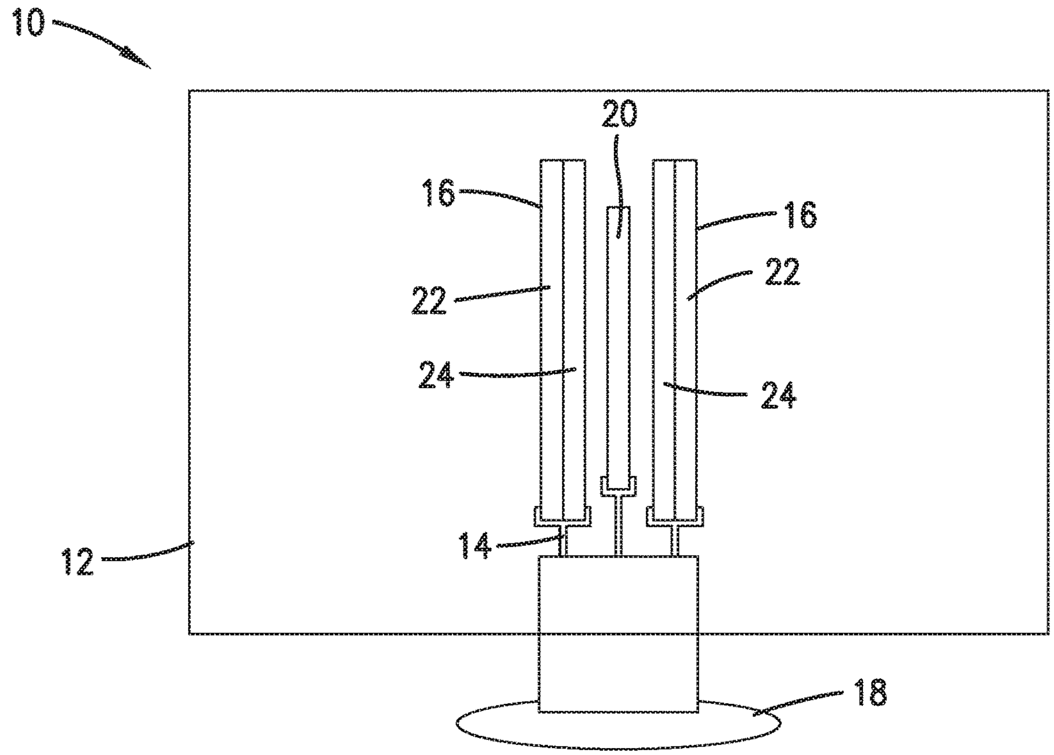
FIG. 1 is a schematic diagram of an annealing system constructed in accordance with various embodiments of the invention.

As illustrated in FIG. 1, an annealing system 10 of the present invention may comprise a uniform microwave field generator 12, support elements 14, two plates 16 held in spaced relation to each other, and a turntable device 18 configured to rotate the two plates 16 and the target substrate 20 within a uniform microwave field in the uniform microwave field generator 12. Although one set of the parallel plates 16 is described herein, note that many additional plates may be stacked vertically to form a batch reaction (i.e., run multiple target substrates at one time).

Figure 2:
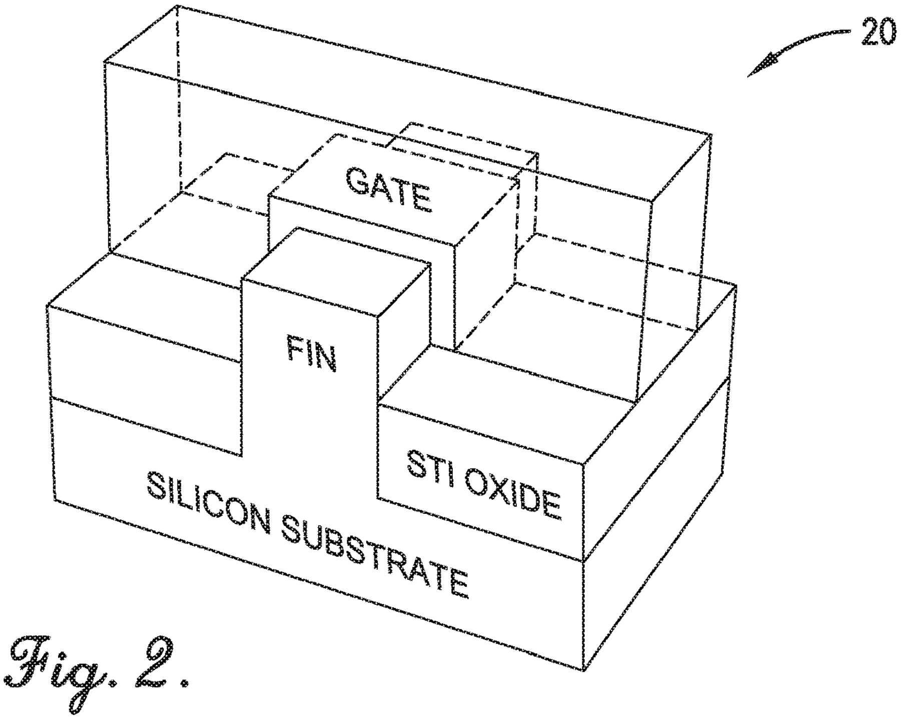
FIG. 2 is a perspective schematic view of an example target substrate to be heated in the annealing system of FIG. 1.
Figure 3:
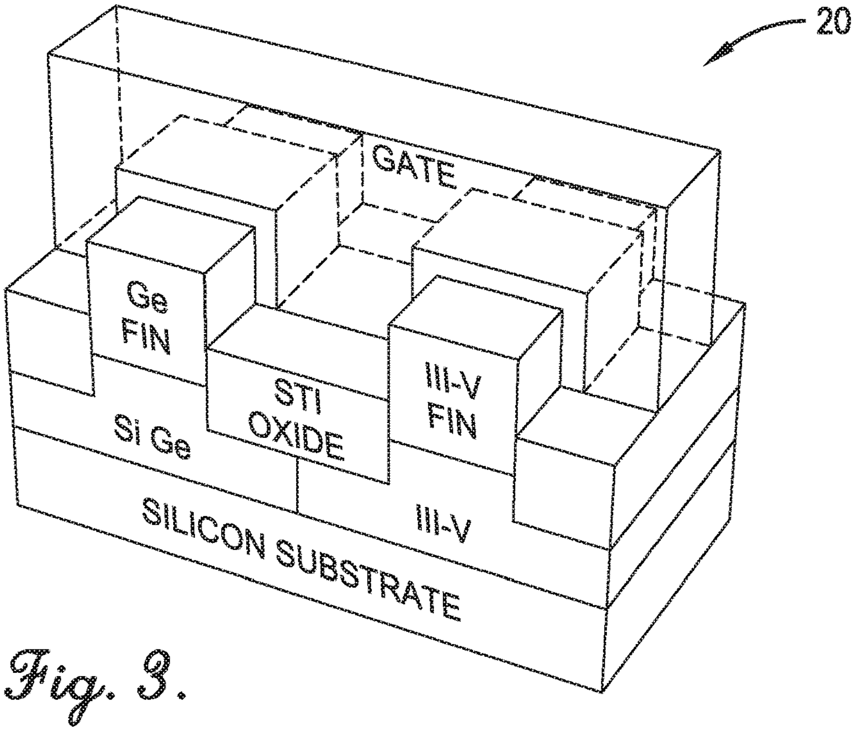
FIG. 3 is a perspective schematic view of another example target substrate to be heated in the annealing system of FIG. 1.

The target substrate 20 may be a substrate material of any geometry known in the art, such as a semiconductor device, an ion-implanted wafer, and/or a silicon wafer and may have a flat plate or wafer geometry. For example, the target substrate 20 may be a semiconductor substrate doped with specific dopant impurities (e.g., Boron, Arsenic, Phosphorus) to form source/drain junctions. In some embodiments of the invention, the target substrate 20 may be a transistor, as schematically illustrated in FIGS. 2 and 3. Additionally or alternatively, the target substrate 20 may include a plurality of target substrates, such as multiple ion-implanted wafers located between the plates 16 described herein. An annealing treatment of the target substrate 20 may be used to complete activation thereof and repair any associated damage to the implanted region, as described in detail below.

The uniform microwave field generator 12 may be a single mode or multi-mode chamber, or may alternatively include a wave guide port configured for forming a microwave field around and/or between the plates 16 described below. In some embodiments of the invention, the range of microwave frequencies generated by the uniform microwave field generator 12 may be in a range of approximately 900 MHz to 26 GHz. For example, the frequencies generated by the microwave field generator 12 may be approximately 915 MHz, approximately 2.45 GHz, or approximately 5.8 GHz or 24 GHz. However, the uniform microwave field generator 12 may be configured to generate any desired microwave frequencies without departing from the scope of the invention. In some embodiments of the invention, the heat generated by the uniform microwave field generator 12 may be in a range of approximately 400° C. to 800° C. However, other temperatures may be used without departing from the scope of the invention.

The support elements 14 may be made of an insulator material such as quartz and may be configured for holding and/or supporting the plates 16 and the target substrate 20. For example, the support elements 14 may be fixed to a rotating element of the turntable device 18 and may include first and second elements configured to hold first and second plates 16, respectively, and a third element configured to hold the target substrate 20, as shown in FIG. 1. Alternatively, the support elements 14 may be attached to inner walls or other portions of the uniform microwave field generator 12. Furthermore, the support elements 14 may comprise slots, clamps, or other configurations for fixing the plates 16 and the target substrate 20 at pre-defined distances from each other. In some embodiments of the invention, the support elements 14 may be selectively adjustable, such that different spacing may be used for different plates 16 and/or different target substrates 20 of different geometries and/or different materials.

The plates 16 may be substantially parallel to each other and may each include a semiconductor layer 22 and a susceptor layer 24. The susceptor layer 24 may be positioned nearest to the target substrate 20, with each of the semiconductor layers 22 outward of the two facing susceptor layers 24. However, in some embodiments of the invention, the susceptor layer 24 may be omitted.

The semiconductor layer 22 may be configured to act as a dielectric at lower temperatures and as a metal at higher temperatures. Thus, the semiconductor layer 22 increases in conductivity with increases in temperature, creating a capacitance field to create a capacitance E-field plane between the two semiconductor layers 22. The plates 16 thus cooperatively act as a parallel plate capacitor. However, in some embodiments of the invention, the semiconductor layer 22 may be alternatively replaced with a conductor layer made of metals or other such conductive materials that become conductive when temperature increases, as long as such metals and other materials, when heated as described herein, fall within a conductivity range able to carry a surface current flow.

The susceptor layers 24 may be used to pre-heat the target substrate 20 located therebetween. Specifically, the susceptor layers 24 may be made of material configured to absorb the microwaves and thus cooperatively create a uniform microwave field therebetween. However, in some alternative embodiments of the invention, the susceptor layers 24 may be omitted if the uniform microwave field is otherwise created between and/or around the two semiconductor layers 22.

The plates 16 may have any dimensions and geometries known in the art. In some embodiments of the invention, the plates 16 may be disc-shaped, square, or rectangular. Furthermore, the plates 16 may be thin flat discs having a thickness generally associated to a plate or disc in the solid state industry. The plates 16 may have a spacing of approximately 0.5 mm to approximately 5 mm from each other. The plates 16 may preferably be as thin as possible without being so thin as to sacrifice structural integrity thereof when mounted on the support elements 14 and/or while heated within the uniform microwave field generator 12. In some embodiments of the invention, the plates 16 may be spaced approximately 1 mm to 10 mm apart. However, other spacing distances may be used without departing from the scope of the invention. Specifically, the plates 16 should be spaced close enough together to form a capacitance effect, and therefore close enough for the surface current (i.e., eddy currents) to react, as described herein.

In some embodiments of the invention, the plates 16 may be positioned in any orientation within the uniform microwave field, such as horizontal, vertical, or otherwise. The plates 16 may typically be arranged in parallel orientation relative to each other. However, in some alternative embodiments of the invention, the plates 16 may be positioned in non-parallel relation to each other and/or the target substrate 20, as long as the plates 16 are in close enough proximity to form the capacitance effect described herein.

The turntable device 18 may be any mechanism known in the art for creating rotation of items attached thereto. For example, the turntable device 18 may include a rotary motor located outward of the uniform microwave field generator. Furthermore, one of the support elements 14 described above may be attached to a spinning axis of the rotary motor and may extend into the uniform microwave field generator 12 to rotatably support the plates 16 and/or the target substrate 20 at desired locations and desired spacing from each other. Within the uniform microwave field, the rotation of the two plates 16 and the target substrate 20 may change polarity of microwaves being applied thereto, simulating RF switching of prior art methods. For example, the annealing system 10 may be configured such that the rotation of the target substrate 20 may change polarity of microwaves applied thereto every 15°. Other methods of switching the microwave polarity may alternatively be used without departing from the scope of the invention.

The turntable device 18 may be configured for any speed that does not cause detachment of the plates 16 and/or the target substrate 20. In some embodiments of the invention, the turntable device 18 may rotate the plates 16 and/or the target substrate 20 at a minimum speed of one rotation per minute (rpm) and a maximum speed of 10 rpm. For example, the turntable device 18 may rotate the plates 16 and/or the target substrate 20 at a speed of approximately 2 rpm. However, other speeds may be used without departing from the scope of the invention.

In use, the target substrate 20 may be placed between the plates 16 within the uniform microwave field generator 12 and rotated by the turntable device 18 within the uniform microwave field, thus creating a periodic change in polarity of the microwaves applied to the target substrate 20. The target substrate 20 will be primarily heated based on its own dielectric properties, converting the microwaves to heat and/or creating eddy currents on the surface of the target substrate 20. The eddy currents react by flowing perpendicular to the plates 16, as described below, evenly heating the target substrate 20. In some embodiments of the invention, the plates 16 may require doping to react to the uniform microwave field.

FIG. 4 illustrates steps in a method 200 for annealing semiconductor material using a uniform microwave field and parallel plate reaction, in accordance with various embodiments of the present invention. The steps of the method 200 may be performed in the order as shown in FIG. 4, or they may be performed in a different order. Furthermore, some steps may be performed concurrently as opposed to sequentially. In addition, some steps may not be performed. Some of the steps may represent code segments or executable instructions of the computer program or applications described above.

Figure 5:
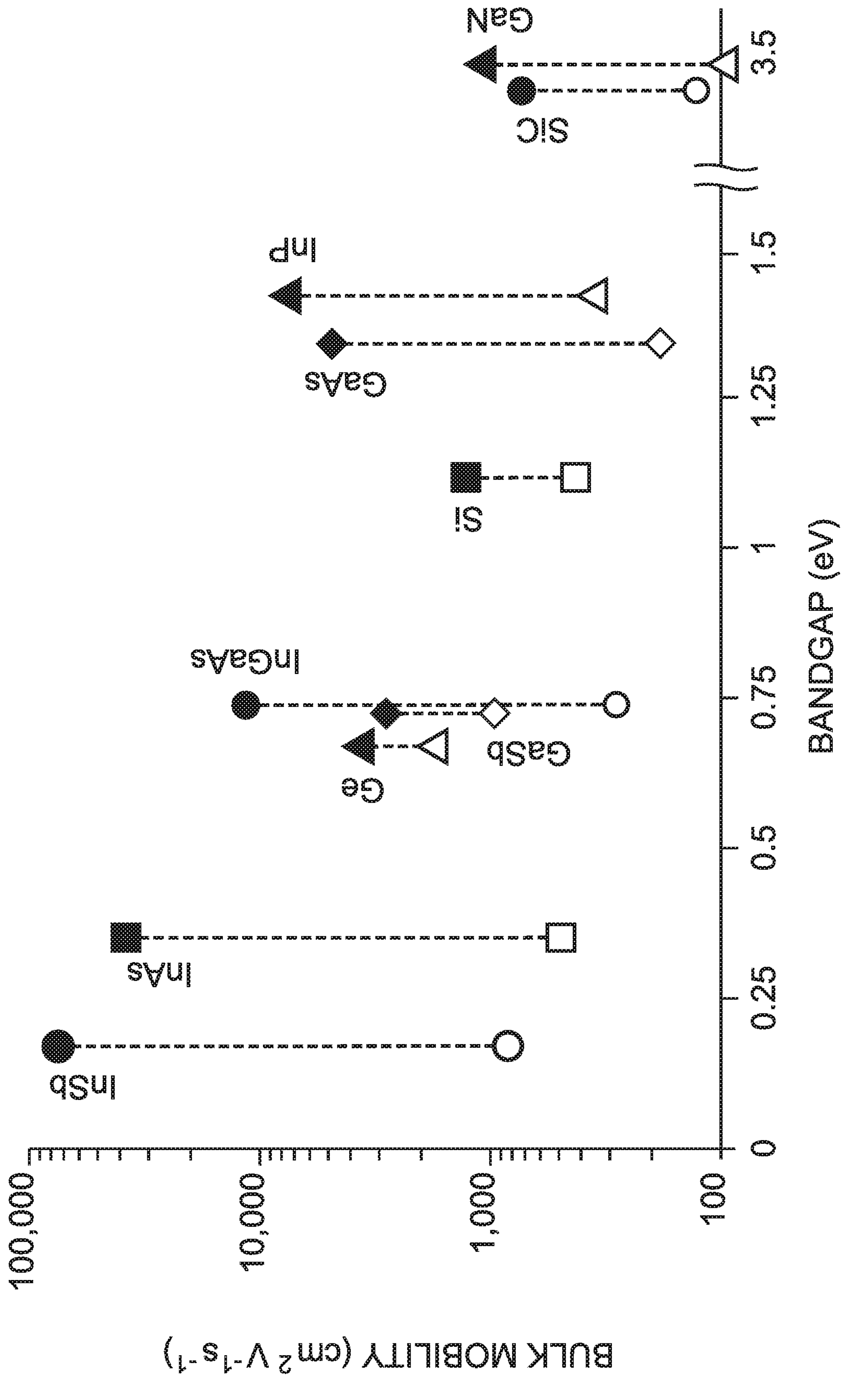
FIG. 5 is a chart of band gap versus bulk mobility for different semiconductor materials of the target substrate.

In some embodiments of the invention, the method 200 may include a step of doping the plates 16 to react to the uniform microwave field, as depicted in block 202. For example, intrinsic silicon at room temperature may be primarily microwave transparent and can be doped to react to the microwave E-field. Doping the silicon material may change the conductivity at room temperature, thus allowing microwaves to heat/react the silicone parallel plates at room temperature. In this example, once the silicone plates are heated, the conductivity thereof may decrease based on a band gap of the extrinsic silicon material. A graph illustrating the band gap of various materials and their bulk mobility is provided in FIG. 5. This decrease in conductivity may achieve a microwave reaction/penetration and, when the temperature or conductivity is in range, creates a parallel plate E-field within a microwave field. Within the parallel plate E-field described herein, the eddy currents created from a microwave reaction will flow vertical or perpendicular to the target substrate 20 (as illustrated in FIG. 10), and not parallel to the surface, as per traditional microwave reactions of metals (as illustrated in FIG. 9).

In some embodiments of the invention, the method 200 may optionally include a step of adjusting a distance between the plates 16, as depicted in block 204, based on geometries and materials used for at least one of the plates and the target substrate. For example, as described above, the support elements 14 may be selectively adjustable, such that different spacing may be used for different plates 16 and/or different target substrates 20 of different geometries and/or different materials.

The method 200 may further include a step of placing the target substrate 20 between the plates 16 within the uniform microwave field (e.g., multi-mode chamber), as depicted in block 206. As described above, the spacing of the plates 16 may be approximately 0.5 mm to approximately 5 mm or 10 mm from each other. The target substrate 20 and the plates 16 may be suspended by and supported by the support elements 14 made of an insulator material such as quartz, as described above.

Figure 6:
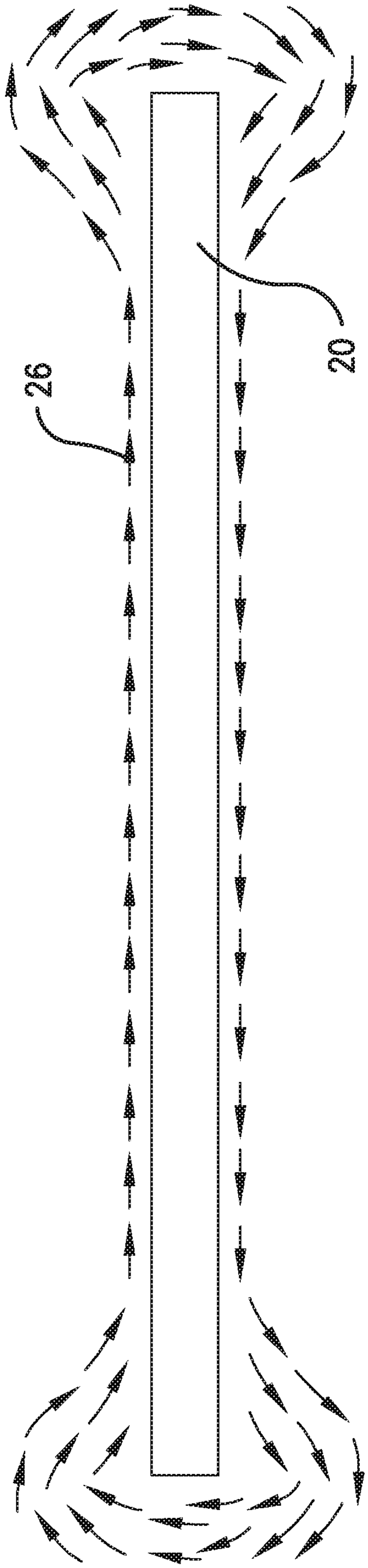
Fig. 6. PRIOR ART
FIG. 6 is a schematic view of a target substrate undergoing prior art traditional microwave heating, with eddy current concentrated at edges of the target substrate and flowing substantially parallel to the surface of the target substrate.
Figure 7:
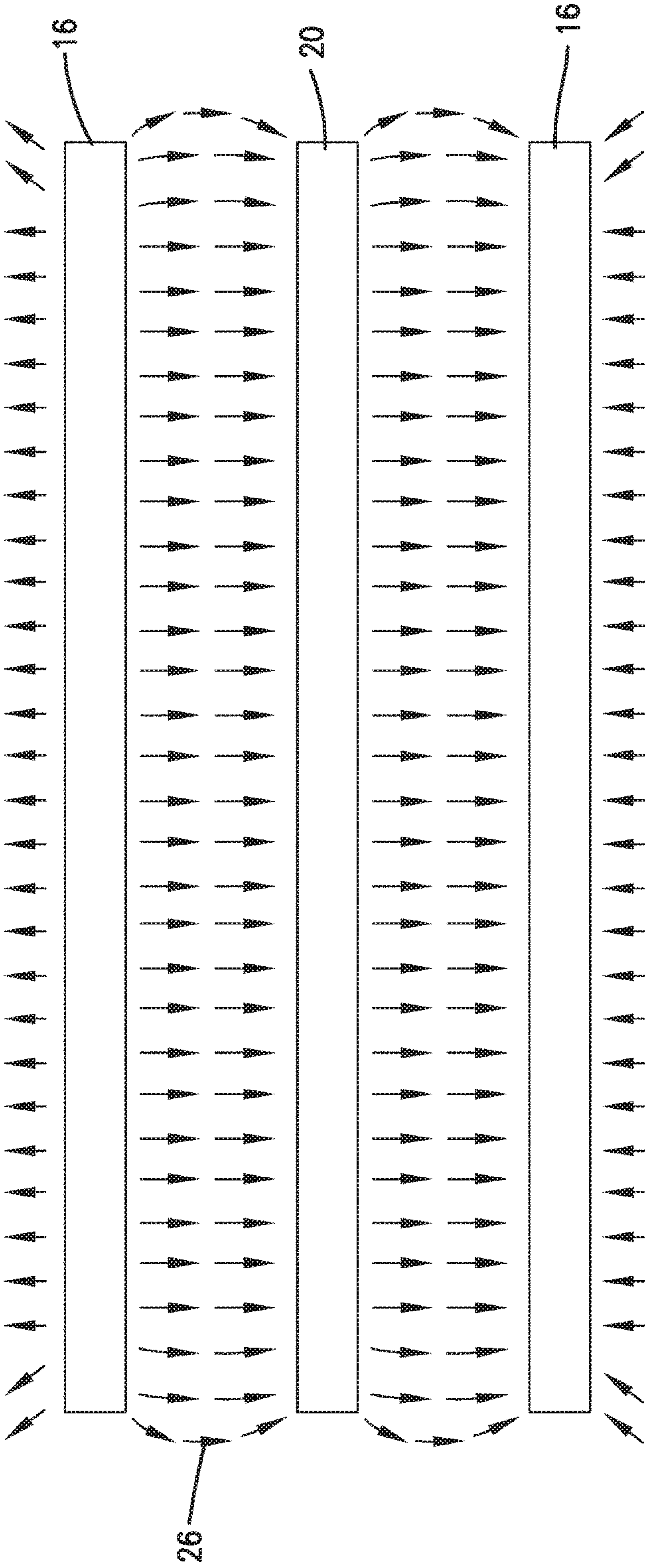
FIG. 7 is a schematic view of a target substrate between the two plates undergoing mobility annealing using the method of FIG. 4, with eddy current flowing perpendicular to the target substrate.

Next, the method 200 may include a step of rotating the plates 16 and/or the target substrate 20 within the uniform microwave field using the turntable device 18, as depicted in block 208, thus creating a periodic change in polarity of the microwaves applied to the target substrate 20. The target substrate 20 will be primarily heated based on its own dielectric properties, converting the microwaves to heat and/or creating eddy currents on the surface of the target substrate 20. Traditionally, surface currents or eddy currents 26 are formed at the edge or boundary of a flat plate and/or the target substrate 20 within a microwave field, as illustrated in FIG. 6. However, the rotating plate configuration disclosed herein provides perpendicular flow of eddy currents 26 relative to the target substrate 20, as illustrated in FIG. 7, creating even heating thereof and selectively heating defects in silicon crystal lattices of the targeted substrate 20, as illustrated in FIG. 10. Conversely, traditional heating methods, such as simple microwave heating illustrated in FIG. 9, do not selectively heat defects within the silicon crystal lattices.

Specifically, FIG. 8 schematically illustrates the target substrate 20 with a silicon crystal lattice 28 having a defect 30, also known as an area of mobility reduction. FIG. 9 illustrates that same silicon crystal lattice 28 being heated by microwaves 32 alone, with the resulting eddy currents 26 flowing parallel to the target substrate 20. FIG. 9 also depicts internal heat 34 generated in the silicon crystal lattice 28 by the microwaves 32.

FIG. 10 illustrates the silicon crystal lattice 28 being heated via the method 200 described above and depicted in FIG. 4, with the resulting internal heat 34 further volumetrically targeting the defect 30 therein via the eddy currents 26 flowing perpendicularly into the target substrate 20. The redirection of the eddy currents 26 allows interfacial polarization to occur in the target substrate 20 at select points where the eddy current 26 is inhibited (e.g. grain defect, impurities, and other defects 30). The polarization of the defect 30 may not cause a substantial reaction in-itself, but the now polarized defect 30 is also subject to the preexisting microwave field (e.g., microwaves 32), allowing the defect 30 to be heated "selectively." This means the temperature of the defect 30 will be much higher as compared to the remainder of the target substrate 20, also referred to herein as the bulk material. This bulk material may act as a heat sink, dissipating the heat within the bulk material of the target substrate 20.

The heating method 200 described herein thus completes an activation process and repairs any associated damage to the implanted or doped region of the target substrate 20, without the undesired thermal runaway and arcing of prior art microwave annealing methods. Advantageously, instead of trying to manage, minimize, or eliminate the formation of eddy currents, as in prior art microwave methods, the present invention changes the direction in which the resulting eddy currents flow, thereby avoiding uneven heating and effectively repairing defects in the target substrate 20.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method for annealing semiconductor material, the method comprising the steps of:

placing a target substrate including the semiconductor material between two plates within a uniform microwave field;

holding the target substrate upright; and rotating the two plates and the target substrate about an axis along a diametric line of the target substrate, thereby creating a periodic change in polarity of microwaves applied to the target substrate from the uniform microwave field, such that the periodic change creates a flow of eddy currents within the target substrate that is perpendicular to a surface of the target substrate.

2. The method of claim 1, wherein the target substrate is held by an edge while the plates and the target substrate are being rotated.

3. The method of claim 1, further comprising doping the plates prior to placing the target substrate therebetween, wherein the doping is sufficient to cause the plates to react to the uniform microwave field.

4. The method of claim 1, wherein the target substrate comprises a semiconductor substrate doped with impurities.

5. The method of claim 1, further comprising adjusting a distance between the plates based on geometries and materials used for at least one of the plates and the target substrate.

6. The method of claim 1, wherein the uniform microwave field includes frequencies in a range of 900 MHz to 26 GHz.

* * * * *